(12) United States Patent
Kakou et al.

(10) Patent No.: US 7,301,557 B2
(45) Date of Patent: Nov. 27, 2007

(54) COMPOSITE CAMERA SYSTEM, ZOOM CAMERA IMAGE DISPLAY CONTROL METHOD, ZOOM CAMERA CONTROL METHOD, CONTROL PROGRAM, AND COMPUTER READABLE RECORDING MEDIUM

(75) Inventors: Noritoshi Kakou, Nara (JP); Yoshio Fukuhara, Saitama (JP); Masahiro Misawa, Hyogo (JP)

(73) Assignee: Sharp Kabushiki Kaisha, Osaka (JP)

( * ) Notice: Subject to any disclaimer, the term of this patent is extended or adjusted under 35 U.S.C. 154(b) by 614 days.

(21) Appl. No.: 10/376,879

(22) Filed: Feb. 27, 2003

(65) Prior Publication Data

US 2003/0160868 A1  Aug. 28, 2003

(30) Foreign Application Priority Data

Feb. 28, 2002  (JP) .............................. 2002-054967

(51) Int. Cl.
*H04N 7/18* (2006.01)
(52) U.S. Cl. .......................................... 348/36; 348/39
(58) Field of Classification Search ........ 348/142–160, 348/36–39
See application file for complete search history.

(56) References Cited

U.S. PATENT DOCUMENTS

| | | | |
|---|---|---|---|
| 5,164,827 A * | 11/1992 | Paff ........................... 348/143 |
| 5,278,643 A | 1/1994 | Takemoto et al. |
| 5,359,363 A * | 10/1994 | Kuban et al. .................. 348/36 |
| 5,920,337 A * | 7/1999 | Glassman et al. ............. 348/36 |
| 6,097,429 A | 8/2000 | Seeley et al. |
| 6,215,519 B1 * | 4/2001 | Nayar et al. .................. 348/159 |
| 6,359,647 B1 * | 3/2002 | Sengupta et al. ........... 348/154 |

FOREIGN PATENT DOCUMENTS

| | | |
|---|---|---|
| EP | 0 714 081 A1 | 5/1996 |
| EP | 0 878 965 A2 | 11/1998 |
| JP | 03-084700 | 4/1991 |
| JP | 7-37100 | 2/1995 |
| JP | 11-259775 | 9/1999 |
| JP | 2001-251608 | 9/2001 |
| WO | WO-94/17636 | 8/1994 |
| WO | WO 99/45511 | 9/1999 |

\* cited by examiner

*Primary Examiner*—Andy S. Rao
(74) *Attorney, Agent, or Firm*—David G. Conlin; Steven M. Jensen; Edwards Angell Palmer & Dodge LLP

(57) ABSTRACT

A composite camera system includes a control section for performing positional control and magnification ratio control of at least one zoom camera ratio for omnidirectional image data centered on a prescribed portion thereof, the omnidirectional image data being obtained by an omnidirectional camera capable of taking an omnidirectional image over a viewing angle of a maximum of 360 degrees; and a display section for displaying an omnidirectional image taken by the omnidirectional camera and a zoom image taken by the zoom camera.

19 Claims, 10 Drawing Sheets

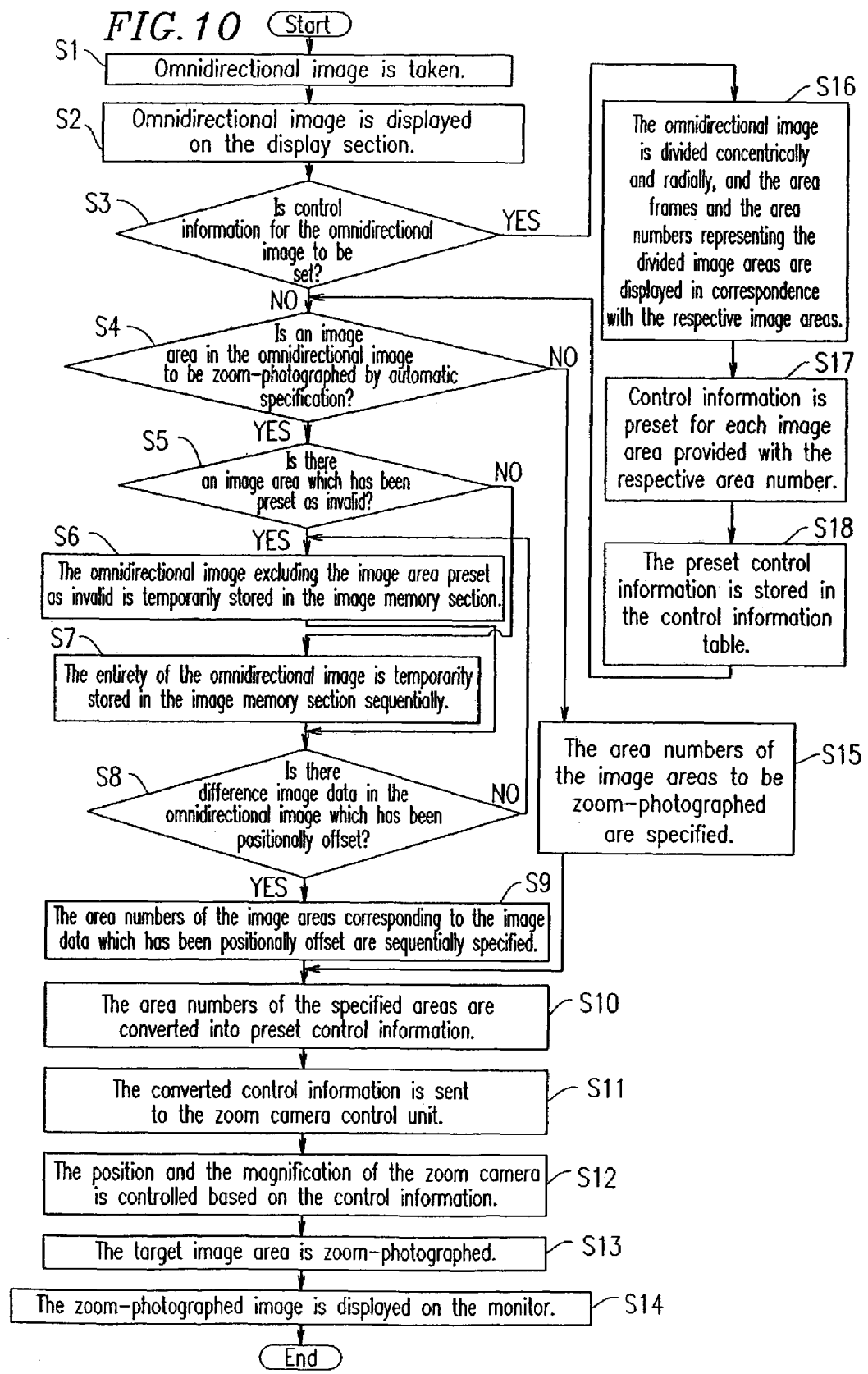

COMPOSITE CAMERA SYSTEM, ZOOM CAMERA IMAGE DISPLAY CONTROL METHOD, ZOOM CAMERA CONTROL METHOD, CONTROL PROGRAM, AND COMPUTER READABLE RECORDING MEDIUM

BACKGROUND OF THE INVENTION

1. Field of the Invention

The present invention relates to a composite camera system for taking an omnidirectional image using an omnidirectional camera capable of capturing information of a viewing angle of a maximum of 360 degrees, and zoom-photographing an area including an image area which is automatically or manually specified from the omnidirectional image by a zoom camera; a zoom camera image display control method and a zoom camera control method using the same, a control program usable for the same, and a computer readable recording medium having the program stored therein.

2. Description of the Related Art

Monitoring cameras conventionally and generally known as used in security devices installed in, for example, financial institutions and supermarkets include fixed-type and pivotable cameras. Usually, a manager checks a video taken by such a monitoring camera using a monitoring device or the like in the manager's office, so that the manager can recognize any abnormality caused by, for example, a trespasser or a fire and take emergency measures.

A monitoring instrument for allowing the manager to monitor a video taken by the monitoring camera on a screen of a monitoring device is inevitably large-sized and can be quite expensive. Even such a large instrument is still insufficient for accurately monitoring a target of crime prevention at a remote location.

Generally known security monitoring devices include devices which issue an alarm using (i) sensors for sensing a trespasser who intercepts, for example, laser light or infrared rays; or (ii) sensors for sensing fires and gas leaks. When such a security device using such a sensor gives an alarm, the manager can recognize that an abnormality has occurred, but cannot obtain accurate information by visually checking the degree or details of the abnormality.

As the number of crimes increases year by year, a security monitoring system has been demanded for allowing the manager at a remote location to accurately identify the occurrence of an abnormality while monitoring the target of crime prevention without requiring the manager to pay special attention.

Proposals for solving the above-described problems are described in, for example, Japanese Laid-Open Publication No. 3-84700 directed to "Remote Monitoring Device", Japanese Laid-Open Publication No. 4-176484 directed to "Monitoring System in Play Hall", and Japanese Laid-Open Publication No. 11-259775 directed to "Monitoring System".

The "Remote Monitoring Device" disclosed by Japanese Laid-Open Publication No. 3-84700 operates as follows. A plurality of sensors are dispersed in blocks of a monitoring area such that each sensor can detect an abnormality in the respective block. When an abnormality is detected, a TV camera is automatically directed to the site of the abnormality, and transfers the abnormality detection signal and the video signal captured by the TV camera to a terminal in the monitoring office. The terminal automatically displays the image of the site of the abnormality and related information. Thus, the situation at the site of the abnormality is recognized easily and with certainty.

The "Monitoring System in Play Hall" disclosed by Japanese Laid-Open Publication No. 4-176484 operates as follows. A monitoring video camera is set to a monitoring state for monitoring a game machine, which has been determined to be in an abnormality based on the result of analysis of information obtained by abnormality detection means. The video information on that game machine is displayed on the screen of the video camera. Thus, the monitoring efficiency of each game machine can be improved at low equipment cost.

The "Monitoring System" disclosed by Japanese Laid-Open Publication No. 11-259775 operates as follows. An image of a monitoring area is captured by a wide-range camera, and the captured image is compared with an image of a normal state so as to find a difference. Thus, an abnormality is detected. When an abnormality occurs, an image of the abnormality is captured by the wide-range camera, and also an image at an important location is captured by a zoom camera. The image obtained by the wide-range camera and the image obtained by the zoom camera are transferred to a terminal computer. Thus, a manager at a remote location can recognize that the situation of the abnormality relatively in detail, and accurately specify the degree of the abnormality and the like.

The above-described technologies have the following problems.

In the case of the "Remote Monitoring Device" disclosed by Japanese Laid-Open Publication No. 3-84700, the sensors are dispersed. This means that the sensors can detect abnormalities only at sites where the sensors are located. In addition, certain types of sensor can only detect an abnormality of the respective type. There are other problems in that the reliability of the sensors dispersed may be lowered, and it is difficult to control the position of the TV camera with respect to the sensors.

In the case of the "Monitoring System in Play Hall" disclosed by Japanese Laid-Open Publication No. 4-176484, abnormality detection means including various sensors needs to be located in the vicinity of each game machine. Therefore, abnormalities only at sites where the sensors are located can be detected. There are other problems in that the sensors may malfunction because of the environment in which the sensors are located, and it is troublesome to control the position of the TV camera with respect to the various sensors.

In the case of the "Monitoring System" disclosed by Japanese Laid-Open Publication No. 11-259775, the wide-range camera acts as one sensor for comparing an image of a target of monitoring and an image of a normal state and detecting an abnormality based on the difference. The zoom camera is set to be directed to several preset important locations. The zoom camera is not structured so as to track the sites of abnormality photographed by the wide-range camera and to have the position and the magnification ratio thereof controlled. Therefore, when there are many important locations, the important location at which an abnormality has occurred needs to be visually checked. This requires images of a plurality of important locations to be taken simultaneously.

SUMMARY OF THE INVENTION

According to one aspect of the invention, a composite camera system includes a control section for performing positional control and magnification ratio control of at least one zoom camera ratio for omnidirectional image data centered on a prescribed portion thereof, the omnidirectional image data being obtained by an omnidirectional camera capable of taking an omnidirectional image over a viewing angle of a maximum of 360 degrees; and a display section for displaying an omnidirectional image taken by the omnidirectional camera and a zoom image taken by the zoom camera.

In one embodiment of the invention, the positional control for controlling a photographic position is performed by pan driving and tilt driving, and the magnification ratio control is performed by zoom driving.

In one embodiment of the invention, the prescribed portion of the omnidirectional image data is a divided image area which is set in a photographed image.

In one embodiment of the invention, the control section includes a dividing section for dividing the omnidirectional image displayed on a display screen of the display section into a plurality of image areas; a specifying section for automatically or manually specifying at least one image area from the plurality of image areas; a converting section for converting information on the at least one image area specified by the specifying section into control information for controlling the zoom camera to be at a prescribed position and to have a prescribed magnification ratio for photographing an image area specified by the specifying section; and a zoom camera control section for controlling the zoom camera to be at the prescribed position and to have the prescribed magnification ratio for photographing the image area specified by the specifying section, based on the control information converted by the converting section.

In one embodiment of the invention, the omnidirectional camera includes an optical system for projecting the omnidirectional image using a mirror of a parabolic or hyperbolic convex body of revolution, or a fish-eye lens.

In one embodiment of the invention, the composite camera system further includes a control information setting section for presetting the control information for controlling the zoom camera to be at the prescribed position and to have the prescribed magnification ratio for each of the plurality of image areas obtained by the dividing section; and a control information table for storing the preset control information in correspondence with the position of each of the plurality of image areas. The converting section obtains the control information for the image area specified by the specifying section from the control information table and/or from calculation using a prescribed calculation procedure.

In one embodiment of the invention, the composite camera system further includes an image memory section for temporarily storing the omnidirectional image taken by the omnidirectional camera frame by frame sequentially; and a moving body detection section for detecting a movement of a moving body by performing pattern matching of successive frames of the omnidirectional image stored in the image memory section. The detected moving body is zoom-photographed by the zoom camera, and an enlarged image of the moving body is displayed on the display screen of the display section.

In one embodiment of the invention, when the omnidirectional image is circular, the dividing section divides the omnidirectional image concentrically and radially, and displays the plurality of image areas of the omnidirectional image together with area frames defining the plurality of image areas.

In one embodiment of the invention, the dividing section displays the plurality of image areas of the omnidirectional image together with area frames and area numbers defining the plurality of image areas. The control information setting section presets the control information for controlling the zoom camera to be at the prescribed position and to have the prescribed magnification ratio for each of the plurality of image areas provided with the area numbers.

In one embodiment of the invention, the composite camera system further includes an invalid area setting section for presetting, as invalid, an arbitrary area of the omnidirectional image which is unstable due to environmental influence. The invalid area setting section invalidates the specification of the image area by the specifying section.

In one embodiment of the invention, the composite camera system further includes a monitoring area setting section for setting at least one monitoring area in the omnidirectional image; and an alarm information output section for outputting alarm information when the moving body detecting section detects that the moving body has entered the monitoring area. The zoom camera zoom-photographs the moving body which has entered the monitoring area and displays the photographed image of the moving body on the display screen of the display section.

In one embodiment of the invention, the composite camera system further includes a remote controller connected to the omnidirectional camera and the zoom camera via a wireless or wired communication line. An omnidirectional image taken by the omnidirectional camera and an image taken by the zoom camera are transferred to the remote controller via the communication line.

In one embodiment of the invention, the remote controller includes at least the dividing section, the specifying section, and the converting section.

According to another aspect of the invention, a composite camera image display control method includes the processing steps of performing positional control and magnification ratio control of at least one zoom camera for omnidirectional image data centered on a prescribed portion thereof, the omnidirectional image data being obtained by an omnidirectional camera capable of taking an omnidirectional image over a viewing angle of a maximum of 360 degrees; and displaying an omnidirectional image taken by the omnidirectional camera and a zoom image taken by the zoom camera.

According to still another aspect of the invention, a zoom camera control method for performing positional control and magnification ratio control of at least one zoom camera for omnidirectional image data centered on a prescribed portion thereof is provided. The omnidirectional image data is obtained by an omnidirectional camera capable of taking an omnidirectional image over a viewing angle of a maximum of 360 degrees. The method includes the steps of displaying an omnidirectional image taken by the omnidirectional camera; dividing the omnidirectional image displayed on a display screen of the display section into a plurality of image areas; automatically or manually specifying at least one image area from the plurality of image areas; converting information on the at least one image area specified by the specifying section into control information for controlling the zoom camera to be at a prescribed position and to have a prescribed magnification ratio for photographing the image area specified by the specifying section; and controlling the zoom camera to be at the prescribed position and to have the prescribed magnification ratio for photographing the image area specified by the specifying section, based on the control information converted by the converting section.

According to still another aspect of the invention, a control program is provided for causing a computer to execute the steps of displaying an omnidirectional image taken by the omnidirectional camera; dividing the omnidirectional image displayed on a display screen of the display section into a plurality of image areas; automatically or manually specifying at least one image area from the plurality of image areas; converting information on the at least one image area specified by the specifying section into control information for controlling the zoom camera to be at a prescribed position and to have a prescribed magnification ratio for photographing the image area specified by the specifying section; and controlling the zoom camera to be at the prescribed position and to have the prescribed magnification ratio for photographing the image area specified by the specifying section, based on the control information converted by the converting section.

According to still another aspect of the invention, a computer readable recording medium having the above described control program stored therein is provided.

According to still another aspect of the invention, a control program for causing a computer to execute the processing steps of the above-described composite camera image display control method is provided.

As described above, according to the present invention, positional control and magnification ratio control of the zoom camera are performed centered on a prescribed portion of omnidirectional image data, and the omnidirectional image and the zoom image are displayed. The omnidirectional camera is used to photograph a plurality of important locations simultaneously as included in the omnidirectional image, and the zoom camera is used to zoom-photograph a specified image area in the omnidirectional image. By specifying a prescribed image area in the omnidirectional image, the position of the zoom camera can be easily set.

The omnidirectional image over a viewing angle of a maximum of 360 degrees taken by the omnidirectional camera is divided into a plurality of image areas, and an image area of interest is automatically or manually specified among the plurality of image areas. Thus, the specified image area of interest is zoom-photographed by the zoom camera which can be driven to pan, tilt and zoom. Since a large-area monitoring area is photographed by one omnidirectional camera, it is not necessary to install a plurality of monitoring sensors, for example, a plurality of detecting sensors or input sensors for automatic specification of the target image area.

The plurality of image areas obtained by dividing the omnidirectional image act as a plurality of detection sensors or input sensors to calculate the control information for the image area automatically or manually specified. Based on the control information, the zoom camera is controlled to be at a prescribed position (to assume a prescribed photographing direction) and to have a prescribed magnification ratio.

The zoom camera can track a moving body included in the omnidirectional image taken by the omnidirectional camera, zoom-photograph the moving body, and display an enlarged image of the moving body on a display screen of the display section.

In the case where a circular omnidirectional image is divided into a plurality of image areas, and control information is set for controlling the zoom camera to be at a prescribed position and to have a prescribed magnification ratio for each of the plurality of image areas, the division can be performed effectively and the image areas can be displayed so as to be easily identifiable.

Control information for controlling the zoom camera to be at a prescribed position and to have a prescribed magnification ratio for each of the plurality of image areas provided with the respective area numbers can be preset, while viewing the omnidirectional image displayed on the display screen of the display section.

An image area, in the omnidirectional image, which is unstable due to environmental influence can be invalidated in advance. Therefore, a moving body or an abnormality can be accurately detected automatically from the omnidirectional image, so that the position and the magnification ratio of the zoom camera is accurately controlled for the detected moving body or the site of the abnormality.

A plurality of monitoring areas which are to be photographed in different photographing directions can be set for one omnidirectional camera. When a moving body is detected to have entered the monitoring area, alarm information including an alarm sound is output and also the zoom camera is zoomed to the moving body to display the image of the moving body on the display screen of the display section.

The omnidirectional camera and the zoom camera can be remote-controlled via a communication line. Therefore, at a site where a computer is installed, the above-described division of the omnidirectional image, preset of the control information for controlling the position and the magnification ratio of the zoom camera for a specified image area, and photographing and display of an area including the specified image area can be performed.

Thus, the invention described herein makes possible the advantages of providing a composite camera system for photographing a plurality of important locations simultaneously as included in an omnidirectional image using an omnidirectional camera, and zoom-photographing a specified image area in the omnidirectional image with the position of a zoom camera being easily controlled; a zoom camera image display control method and a zoom camera control method using the same; a control program usable for the same; and a computer readable recording medium having the program stored therein.

These and other advantages of the present invention will become apparent to those skilled in the art upon reading and understanding the following detailed description with reference to the accompanying figures.

BRIEF DESCRIPTION OF THE DRAWINGS

FIG. 10 is a flowchart illustrating a basic operation procedure of the composite camera system shown in FIG. 1.

DESCRIPTION OF THE PREFERRED EMBODIMENTS

Hereinafter, the present invention will be described by way of illustrative, but non-limiting examples with reference to the accompanying drawings.

Figure 1:
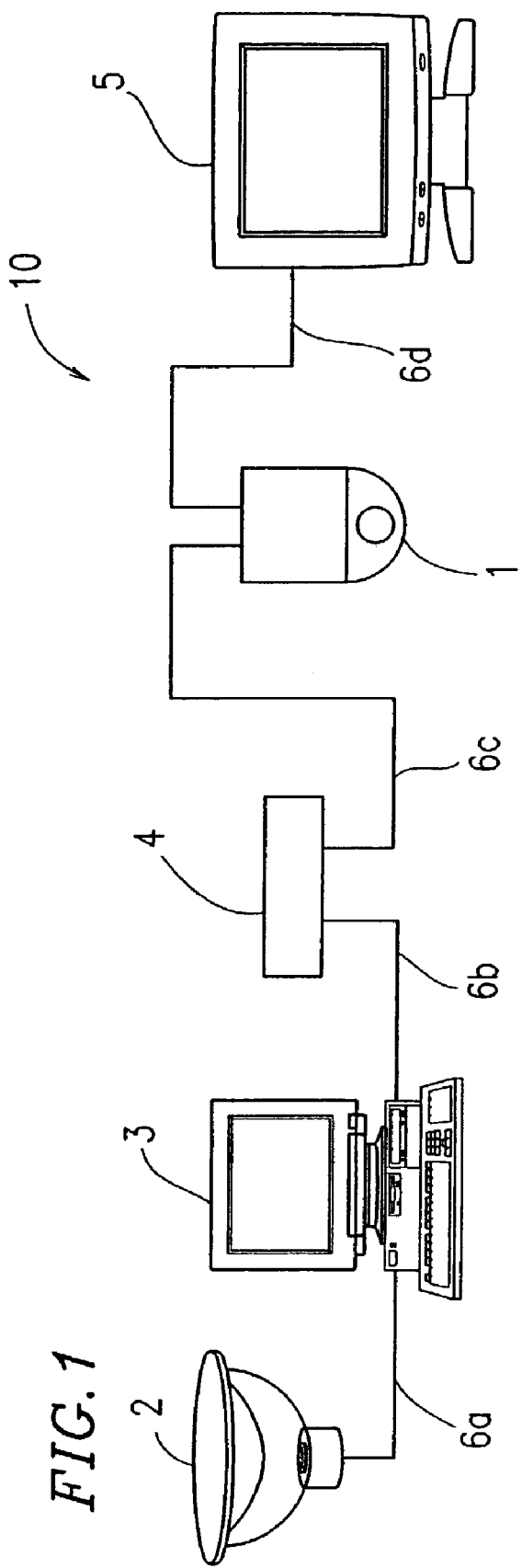
FIG. 1 is a schematic view illustrating a basic structure of a composite camera system according to an example of the present invention.

FIG. 1 is a schematic view illustrating a basic structure of a composite camera system 10 according to an example of the present invention.

In FIG. 1, the composite camera system 10 includes a zoom camera 1, an omnidirectional camera 2, a remote controller 3, a zoom camera control unit 4 acting as a zoom camera control section, a monitor 5, and communication lines 6a through 6d for connecting these elements so that these elements can communicate with each other.

The zoom camera 1 includes, for example, a zoom lens, an imaging section (photographing section) including CCDs, and a driving section for driving and controlling the zoom lens to pan (to move to a prescribed position in a horizontal direction), to tilt (to move to a prescribed position in a vertical direction) and to zoom (to have a prescribed magnification ratio). The zoom camera 1 also includes a communication section for transferring a control signal or an image signal via a wireless or wired line. Based on control information sent from the zoom camera control unit 4, the zoom camera 1 is driven and controlled to be a prescribed position (by pan and tilt) and to have a prescribed magnification ratio (by zoom). For example:

zoom ratio: optical zoom: X23;
   electronic zoom: X10
zoom speed: MAX1.6 seconds (at the preset time)
number of presets: 255 (255 positions and magnification ratios)

The omnidirectional camera 2 includes, for example, an optical system (e.g., a mirror of a convex body of revolution, or a fish-eye lens) for projecting an optical image of an area over a viewing angle of a maximum of 360 degrees, and an imaging section (photographing section), including CCDs, for photographing the optical image as a circular omnidirectional image. For example, a detection area (monitoring area) can have a radius of 15 meters from the omnidirectional camera 2.

The remote controller 3 includes, for example, a personal computer which can communicate with other devices via a wireless or wired line. The remote controller 3 includes an image area dividing section (dividing section) for dividing an omnidirectional image taken by the omnidirectional camera 2 into a plurality of image areas; an image area specifying section (specifying section) for automatically or manually specifying at least one image area from the plurality of image areas obtained by the image area dividing section; a control information converting section (converting section) for converting the information on the image area specified by the specifying section into control information for controlling the zoom camera 1 to move to a prescribed position (by pan driving and tilt driving) and to have a prescribed magnification ratio (by zoom driving) for photographing the image area specified by the image area specifying section; and a display section for displaying the omnidirectional image taken by the omnidirectional camera 2 on a display screen.

The zoom camera control unit 4 includes a computer including, for example, a CPU, ROM, RAM, and I/O port. Based on the control information supplied from the remote controller 3, the zoom camera control unit 4 controls the position and the magnification ratio of the zoom camera 1. The zoom camera control unit 4 has a function of communicating with other devices via a wireless or wired line.

The monitor 5 includes, for example, a liquid crystal display (LCD), a plasma display (PD), or an electroluminescence display (ELD). The monitor 5 displays an image which is zoom-photographed by the zoom camera 1.

Among the communication lines 6a through 6d, the communication line 6a communicates the omnidirectional camera 2 and the remote controller 3 to each other by an NTSC system. The communication line 6a transfers an omnidirectional image taken by the omnidirectional camera 2 to the remote controller 3. The communication line 6b connects the remote controller 3 and the zoom camera control unit 4 to each other by an RS-232C system. The communication line 6b transfers, to the zoom camera control unit 4, control information for controlling the zoom camera 1 to be at a prescribed position (to assume a prescribed photographing direction) and to have a prescribed magnification ratio. The communication line 6c connects the zoom camera control unit 4 and the zoom camera 1 to each other by an RS-485 system, so that the zoom camera control unit 4 controls the position and the magnification ratio of the zoom camera 1 for zooming the specified image area. The communication line 6d connects the zoom camera 1 and the monitor 5 by an NTSC system. The communication line 6d transfers an image zoom-photographed by the zoom camera 1 to the monitor 5.

In this example, the zoom camera control unit 4 is provided as a separate unit. Alternatively, the zoom camera control unit 4 may be incorporated into the remote controller 3 or the zoom camera 1. The zoom camera 1 and the omnidirectional camera 2 can each have a function of communicating with other devices via a wireless or wired line.

Figure 2:
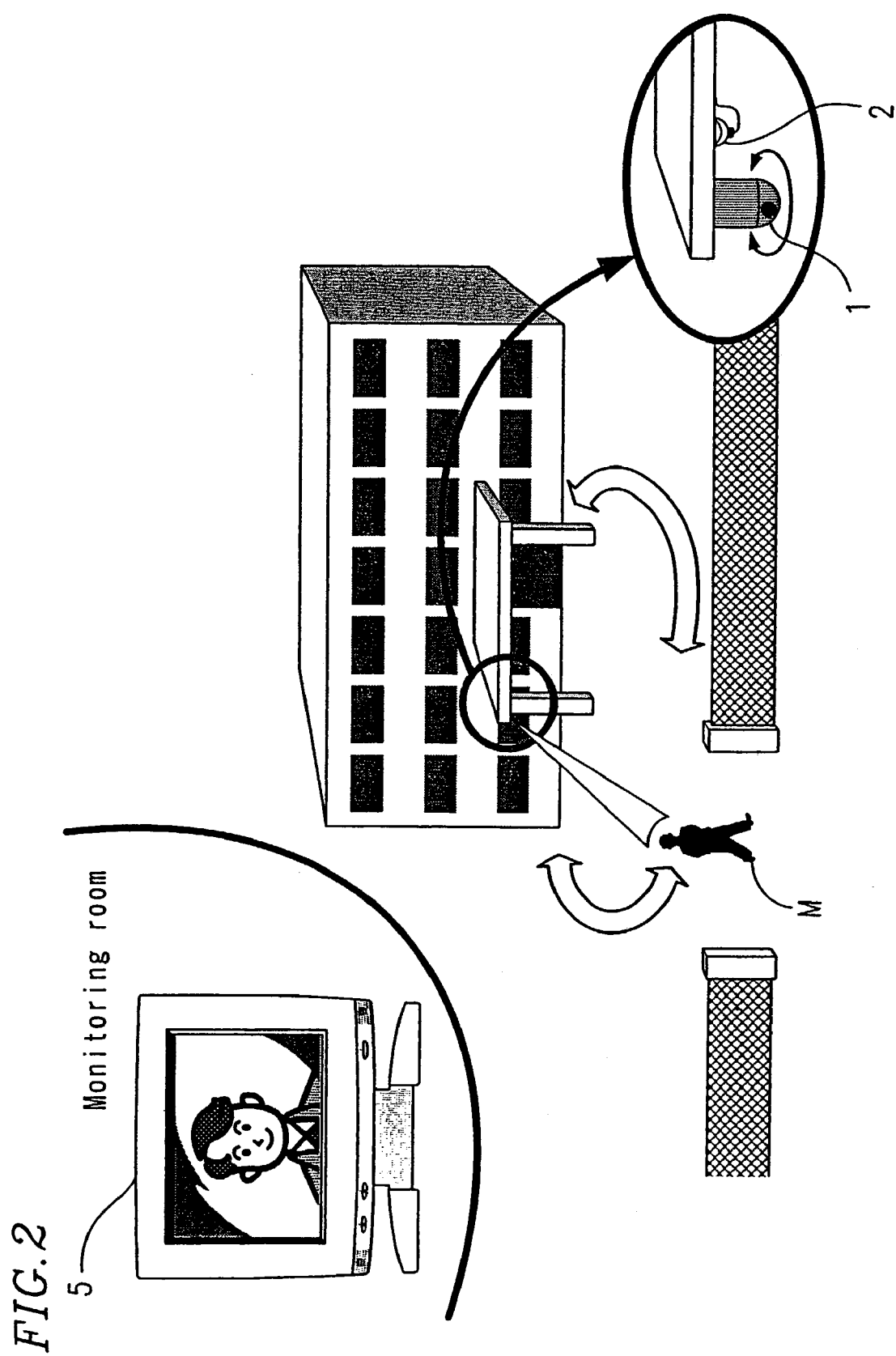
FIG. 2 shows an example of a monitoring system using the composite camera system shown in FIG. 1.

FIG. 2 shows an exemplary monitoring system including the composite camera system 10 shown in FIG. 1. Identical elements previously discussed with respect to FIG. 1 bear identical reference numerals and the detailed descriptions thereof will be omitted.

In FIG. 2, the composite camera system 10 continuously monitors sites for monitoring such as, for example, a schoolyard/school gate/gym/elevator entrance, a parking lot, an office, a store, an apartment building, or a place of amusement, with the omnidirectional camera 2 over a wide range (viewing angle: 360 degrees) with no dead angle. When detecting a trespasser M, the zoom camera 1 is controlled to be directed to the trespasser M and zoom-photographs the trespasser M at a prescribed magnification ratio. The image is displayed by the monitor 5, which is located separately from the remote controller 3 but acts as a display section of the remote controller 3. An enlarged image of the trespasser M may be displayed both on a display screen of the remote controller 3 and a display screen of the monitor 5.

In this example, the zoom camera 1 and the omnidirectional camera 2 are installed over the entrance to a school as shown in FIG. 2. The trespasser M entering through the school gate is detected by the omnidirectional camera 2 and is zoom-photographed by the zoom camera 1. An enlarged image of the trespasser M is displayed on the monitor 5 installed in a monitoring room.

Although not shown in FIG. 2, the remote controller 3 for remote-controlling the omnidirectional camera 2, the zoom camera control unit 4 for controlling the position and the magnification ratio of the zoom camera 1, and the communication lines 6a through 6d for communicating the remote controller 3, the zoom camera 1, the omnidirectional camera 2 and the like are also installed in the monitoring room.

Figure 3:
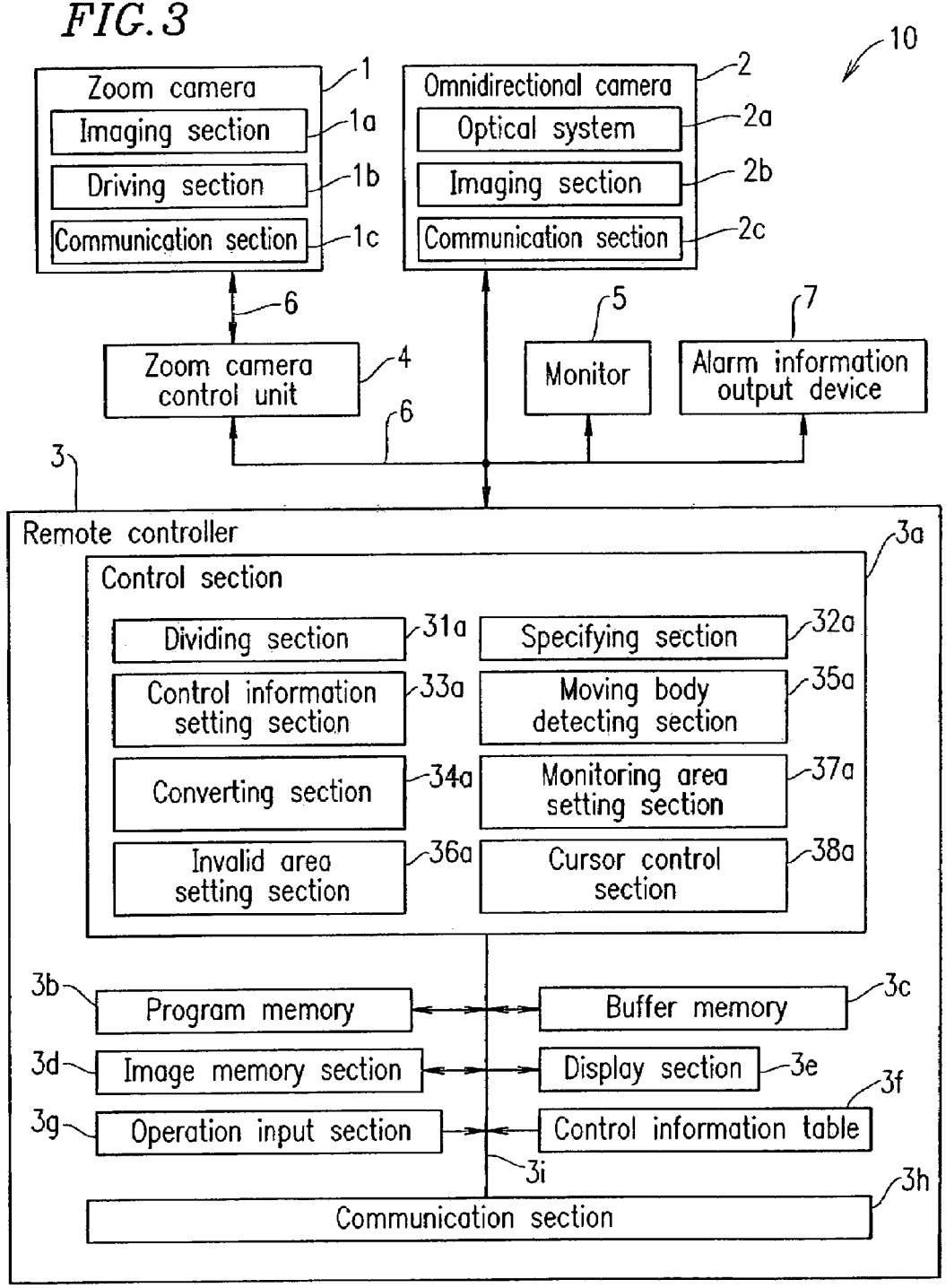
FIG. 3 is a block diagram illustrating a partial structure of the composite camera system shown in FIG. 1.

FIG. 3 is a block diagram illustrating a partial structure of the composite camera system 10 shown in FIG. 1. Identical elements previously discussed with respect to FIG. 1 bear identical reference numerals and the detailed descriptions thereof will be omitted.

In FIG. 3, as described above, the composite camera system 10 includes the zoom camera 1, the omnidirectional camera 2, the remote controller 3, the zoom camera control unit 4 acting as a zoom camera control section, the monitor 5, and communication lines 6 (6a through 6d as shown in FIG. 1). The composite camera system 10 further includes an alarm information output device 7.

The zoom camera 1 includes, for example, an imaging section (photographing section) 1a, a driving section 1b for driving and controlling the zoom lens to pan (to move to a prescribed position in a horizontal direction), to tilt (to move to a prescribed position in a vertical direction) and to zoom (to have a prescribed magnification ratio), and a communication section 1c for communicating with other devices via a wireless or wired line for transference of control signals and image signals. Based on control information sent from the zoom camera control unit 4, the zoom camera 1 is controlled to have a prescribed position (to assume a prescribed photographing direction) and to have a prescribed magnification ratio. The driving section 1b includes, for example, a pulse motor, a DC servo motor, an ultrasonic motor, or an encoder, and has a function of automatic high-speed three-dimensional control of the position and the magnification ratio.

As shown in FIG. 3, the omnidirectional camera 2 includes an optical system 2a, an imaging section (photographic section) 2b including CCDs, and a communication section 2c for communicating with other devices for transference of control signals and image signals via a wireless or wired line.

The optical system 2a includes, for example, a parabolic or hyperbolic mirror of a convex body of revolution or a fish-eye lens, and a cylindrical or cup-shaped light-transmissive body for holding a CCD camera which is included in the imaging section 2b. The optical system 2a projects an optical image over an omnidirectional viewing angle of a maximum of 360 degrees. For example, the optical system 2a projects an optical image obtained by projecting (collecting) light reflected by the mirror of a convex body of revolution by a lens or a fish-eye lens.

The imaging section 2b includes a CCD camera including, for example, an imaging lens, a CCD section, an A/D conversion circuit, and an image processing circuit. The imaging section 2b photographs the optical image projected by the optical system 2a as omnidirectional image data.

The zoom camera control unit 4 includes a computer including, for example, a CPU, ROM, RAM, and I/O port. The zoom camera control unit 4 also has a function of communicating with other devices via a wireless or wired line. Based on the control information supplied from the remote controller 3, the zoom camera control unit 4 controls the position and the magnification ratio of the zoom camera 1.

The monitor 5 includes a liquid crystal display (LCD), a plasma display (PD), an electroluminescence display (ELD), or various other display devices. The monitor 5 also has a function of communicating with other devices via a wireless or wired line. The monitor 5 receives an enlarged image which is zoom-photographed by the zoom camera 1 from the remote controller 3 and displays the enlarged image on a display screen thereof.

The communication lines 6 include a plurality of communication lines for transferring data signals by, for example, an NTSC, RS-232C, or RS-485 system. The communication lines 6 may use a wireless LAN for communicating specific short-distance aerial transmission signals such as, for example, IrDAControl-system infrared signals or Bluetooth-system radio wave signals.

The alarm information output device 7 includes, for example, a buzzer, speaker, and an alarm lamp. When, for example, a moving body such as a trespasser M (FIG. 2) enters a monitoring area, the alarm information output device 7 outputs alarm information including an alarming sound and an alarming light.

The remote controller 3 includes a control section 3a, a program memory 3b, a buffer memory 3c, an image memory section 3d, a display section 3e, a control information table 3f, an operation input device 3g, a communication section 3h, and a bus 3i for transferring data between these sections.

The control section 3a includes a CPU (central processing unit) of the computer. Based on a control program, the control section 3a controls the sections of the composite camera system 10. The detailed structure of the control section 3a will be described later.

The program memory 3b includes, for example, a readable recording medium such as a ROM, EPROM, EEPROM, Floppy® disc, optical disc (for example, compact disc), or hard disc. The program memory 3b stores the control program for starting the control section 3a and causing the control section 3a to execute various operations.

The buffer memory 3c includes, for example, a readable recording medium such as a RAM, EPROM, EEPROM, Floppy® disc or hard disc. The buffer memory 3c temporarily stores data which is being controlled.

The image memory section 3d includes, for example, a readable recording medium such as a RAM, EPROM, EEPROM, Floppy® disc or hard disc. The image memory section 3d temporarily stores an omnidirectional image taken by the omnidirectional camera 2 frame by frame sequentially.

The display section 3e includes, for example, a liquid crystal display (LCD), a plasma display (PD), or an electroluminescence display (ELD). The display section 3e displays an omnidirectional image taken by the omnidirectional camera 2 on a display screen thereof.

The control information table 3f includes, for example, a readable recording medium such as a RAM, EPROM, EEPROM, Floppy® disc or hard disc. The control information table 3f stores control information (information on the position (photographic direction) and the magnification ratio of the zoom camera 1), which is preset by a control information setting section 33a (described below) included in the control section 3a, in correspondence with information on each of the image areas (for example, the area number or the representative coordinate of each of the image areas).

The operation input device 3g includes, for example, a mouse and a keyboard.

The communication section 3h includes, for example, an antenna, modem (signal modulation and demodulation device), a wireless signal conversion circuit, or a communication line connection circuit. The communication section 3h is communicable with the omnidirectional camera 2, the zoom camera control unit 4, the monitor 5, the alarm information output device 7 and the like via the communication lines 6.

The detailed structure of the control section 3a of the remote controller 3 will be described. The control section 3a includes a dividing section 31a, a specifying section 32a, the control information setting section 33a, a converting section 34a, a moving body detecting section 35a, an invalid area setting section 36a, a monitoring area setting section 37a, and a cursor control section 38a. The control section 3a drives the zoom camera 1 through the zoom camera control unit 4 so as to be at a prescribed position (by pan and tilt driving) and to have a prescribed magnification ratio (by zoom driving) for photographing the omnidirectional image data obtained by the omnidirectional camera 2, centered on a specified portion thereof.

Based on a dividing program of the control program, the dividing section 31a divides an omnidirectional image, for example, concentrically and radially. Then, the dividing section 31a displays the divided image areas of the omnidirectional image, together with an area frame which clearly defines each divided image area and an area number added to each divided image area.

Based on an operation specifying instruction from the operation input device 3g and a specifying program of the control program, the specifying section 32a automatically or manually specifies an image area (or a prescribed number of image areas) defined by an area frame (or a prescribed number of image frames) and an area number (or a prescribed number of area numbers), among the plurality of image areas displayed.

Based on an operation setting instruction from the operation input device 3g and a control information setting program of the control program, the control information setting section 33a presets control information for controlling the position and the magnification ratio of the zoom camera 1 on an image area-by-image area basis.

Based on a conversion program of the control program, the converting section 34a converts information on the image area specified by the specifying section 32a into control information for controlling the position and the magnification ratio of the zoom camera 1 for photographing the image area specified by the specifying section 32a. The converting section 34a may obtain the control information for the specified image area from the control information table 3f and/or from calculation using a prescribed calculation procedure, based on the conversion program.

Based on a moving body detecting program of the control program, the moving body detecting section 35a performs pattern matching of successive frames of the omnidirectional image which has been stored in the image memory section 3d, so as to create a difference image. Based on the difference image, the moving body detecting section 35a detects a movement of a moving body (including, for example, an object which changes the image, such as a trespasser M shown in FIG. 2). The detected moving body is zoom-photographed by the zoom camera 1, and an enlarged image of the detected moving body is displayed on a display screen of the monitor 5 and/or the display section 3e.

Based on an operation setting instruction from the operation input device 3g and an invalid area setting program of the control program, the invalid area setting section 36a presets, as invalid, an arbitrary image area in the omnidirectional image which is unstable due to environmental influence. The expression "image area which is unstable due to environmental influence" means an image area representing, for example, an object which moves in a normal state or an object which moves but is too small to be a trespasser or anything causing an abnormality. The invalid area setting section 36a can also display the image area which has been preset as invalid on the display section 3e, so that the image area is identified. When the image preset as invalid has been specified by the specifying section 32a, the invalid area setting section 36a can invalidate the specification.

Based on an operation setting instruction from the operation input device 3g and a monitoring area setting program of the control program, the monitoring area setting section 37a sets at least one monitoring area in the omnidirectional area. Any image area other than the image area which has been invalidated by the invalid area setting section 36a may be set as a monitoring area.

Based on an operation instruction from the operation input device 3g and a cursor control program of the control program, the cursor control section 38a controls the position of the cursor on the display screen.

The composite camera system 10 in this example having the above-described structure, when applied to a monitoring system, provides, for example, the following effects.

(1) The omnidirectional camera 2 realizes monitoring over 360 degrees with no dead angle.

(2) A combination of the omnidirectional camera 2 and the usual zoom camera 1 realizes high-speed display of a high-quality zoom-up image.

(3) An automatic tracking function is provided of detecting a moving body by the omnidirectional camera 2 and zoom-photographing the moving body by the usual zoom camera 1.

(4) The omnidirectional camera 2 realizes wide-area detection.

(5) A manual tracking function is provided of zoom-photographing, at a high speed, an omnidirectional image, centered on a specified area thereof.

The above-described control program is stored in prescribed readable recording memories in the remote controller 3 as follows.

The program memory 3b stores a display step of displaying an omnidirectional image taken by the omnidirectional camera 2 on a display screen; a dividing step of dividing the omnidirectional image into a plurality of image areas; a specifying step of automatically or manually specifying at least one image area from the plurality of divided image areas; and a converting step of converting information on the specified image area into control information for controlling the zoom camera 1 to be at a prescribed position and to have a prescribed magnification ratio for the specified image area.

A memory section in the zoom camera control unit 4 stores a zoom camera control step for controlling the position and the magnification ratio of the zoom camera 1 for photographing the image area specified by the specifying section 32a based on the converted control information.

At least the above-mentioned steps are executed by the computer. The control program may also include, for example, a control information setting step, a moving body detecting step, an invalid area setting step, a monitoring area setting step, a designating step of designating the image area specified by each of these steps, an alarm information output control step, and a zoom image display step.

Figure 4:
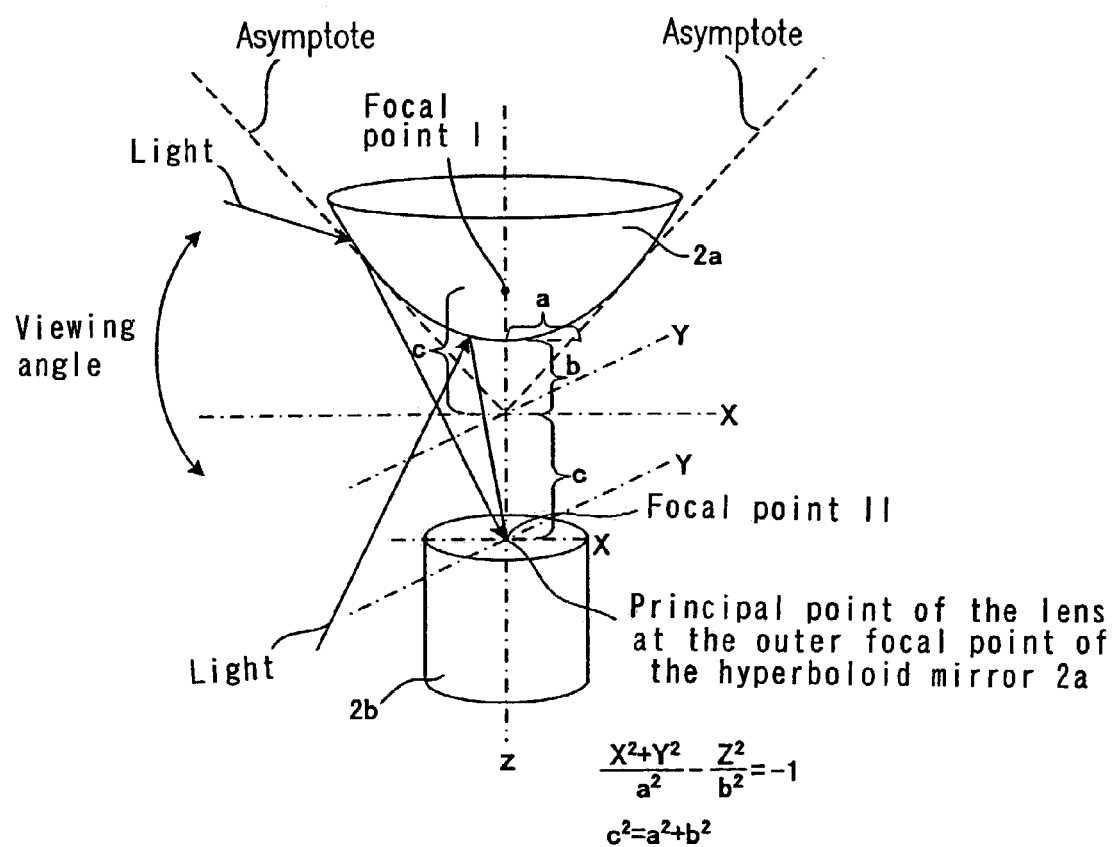
FIG. 4 is a perspective view illustrating a partial structure of an optical system of an omnidirectional camera included in the composite camera system shown in FIG. 1.

FIG. 4 is a perspective view illustrating a partial structure of the optical system 2a (FIG. 3) of the omnidirectional camera 2.

In FIG. 4, the optical system 2a includes a mirror of a convex body of revolution. When a hyperbolic curve is rotated about axis Z, a hyperboloid of two sheets is obtained.

The mirror of the convex body of revolution has a mirror surface on a convex surface of one of the hyperboloids (Z>0).

The one hyperboloid is represented by the following expressions.

$$\{(X^2+Y^2)/a^2\}-Z^2/b^2=-1$$

$$c^2=(a^2+b^2)$$

Here, "a" and "b" are constants defining the shape of the hyperboloid. "c" is a constant defining the position of the focal point of the hyperboloid. These expressions and constants are included in conversion information for converting an omnidirectional image into a panoramic image or a perspective image. For example, these expressions and constants are pre-stored in the program memory 3b in FIG. 3.

The mirror of a convex body of revolution has two focal points, i.e., a first focal point I and a second focal point II. Light entering from the outside of the mirror and directed toward the first focal point I is reflected by the optical system 2a (i.e., by the mirror of the convex body of revolution) and is entirely directed to the second focal point II.

The rotation axis of the mirror of a convex body of revolution is matched to the optical axis of the camera lens of the imaging section 2b, and a first principal point of the camera lens is located at the focal point II. Owing to this arrangement, an image photographed by the imaging section 2b has a center of view point at the first focal point I. When the image is viewed with the first focal point I as the center of view, the position of the viewpoint is not changed in accordance with the viewing direction.

Figure 5:
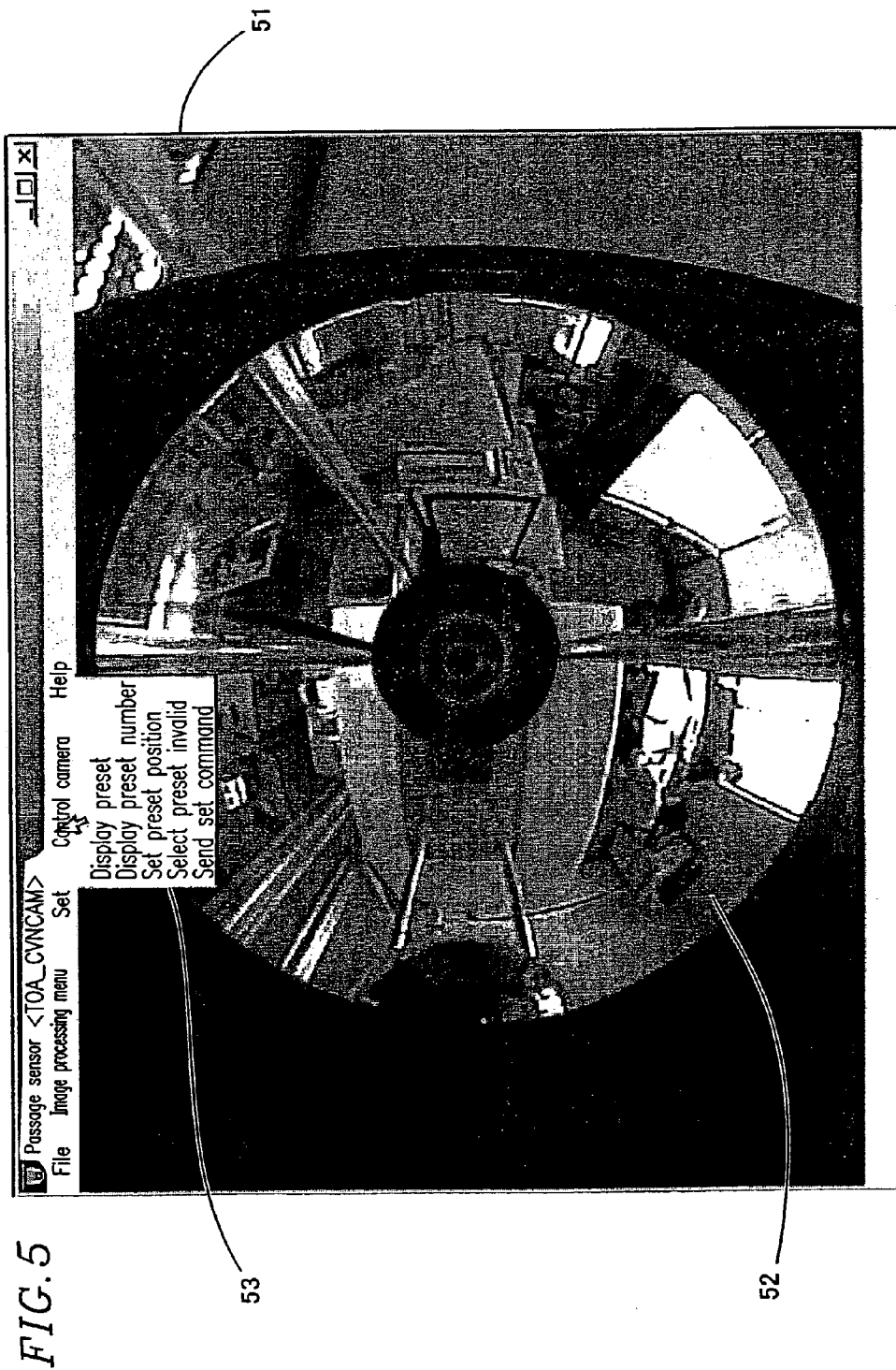
FIG. 5 shows Display Example (1) according to the example of the present invention, which is for setting control information.

FIG. 5 shows Display Example (1) according to this example of the present invention. Display Example (1) is for setting control information.

FIG. 5 shows a window 51 displayed on a display screen of the display section 3e. The window 51 shows a circular omnidirectional image 52, and a pull-down menu 53. The pull-down menu 53 appears when the control information setting section 33a is started by an input operation performed using a mouse or a keyboard. The control information setting section 33a is started for dividing the omnidirectional image 52 into a plurality of image areas and for adding an area number (preset number) to each of the divided image areas.

Figure 6:
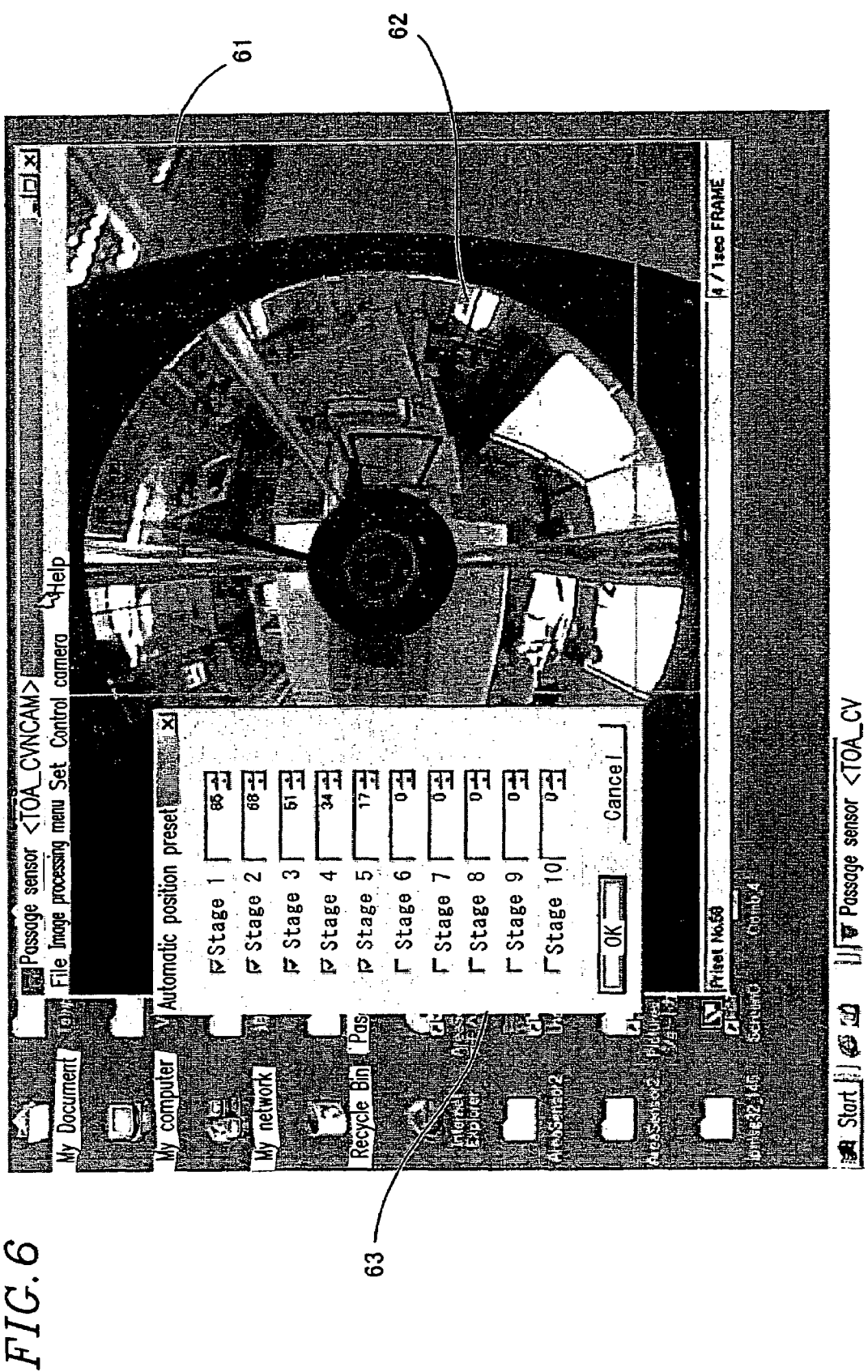
FIG. 6 shows Display Example (2) according to the example of the present invention, which is for setting control information.

FIG. 6 shows Display Example (2) according to this example of the present invention. Display Example (2) is for setting control information.

FIG. 6 shows a window 61 displayed on the display screen of the display section 3e. The window 61 shows a part of a circular omnidirectional image 62, and a window 63. The window 63 appears when the control information setting section 33a is started by an input operation performed using a mouse or a keyboard. The control information setting section 33a is started for dividing the omnidirectional image 62 into a plurality of image areas and for adding an area number (preset number) to each of the divided image areas. The window 63 allows the user to input numerical figures which represent how many image areas the omnidirectional image 62 is to be equally divided into concentrically and radially.

Figure 7:
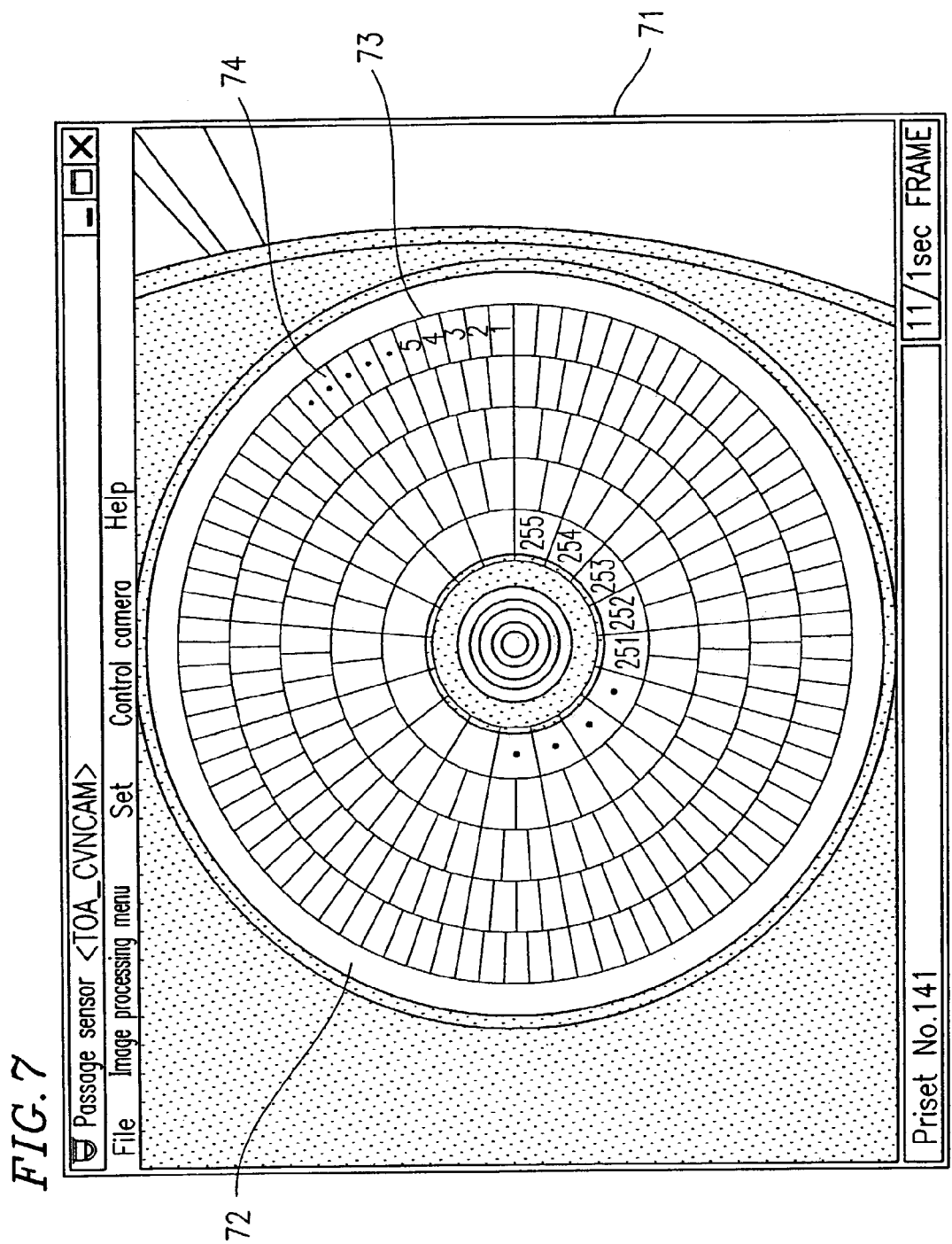
FIG. 7 shows Display Example (3) according to the example of the present invention, which is for setting control information.

In this example, the omnidirectional image 62 is divided into five concentric circles. The window 63 in FIG. 6 shows the numbers of image areas included in the five concentric circles. The omnidirectional image 62 after the division is shown in FIG. 7. Here, the omnidirectional image 62 is divided into 255 image areas.

FIG. 7 shows Display Example (3) according to this example of the present invention. Display Example (3) is for setting control information.

FIG. 7 shows a window 71 displayed on the display screen of the display section 3e. The window 71 shows a circular omnidirectional image 72, image frames 73 obtained as a result of equally dividing the omnidirectional image 72 concentrically and radially by the dividing section 31a based on the numerical figures which was input in the window 63 (FIG. 6), and area numbers 74 added to the divided image areas respectively. In FIG. 7, only some of the area numbers are shown for the sake of simplicity, but actually area numbers 1 through 255 are displayed in the respective image areas.

Control information for controlling the position and the magnification ratio of the zoom camera 1 is provided in correspondence with each of the divided image areas numbered 1 through 255. In this example, the omnidirectional image 72 is divided into 255 image areas, and the zoom camera 1 can be zoomed to any image area, for example, the image area numbered 255.

Figure 8:
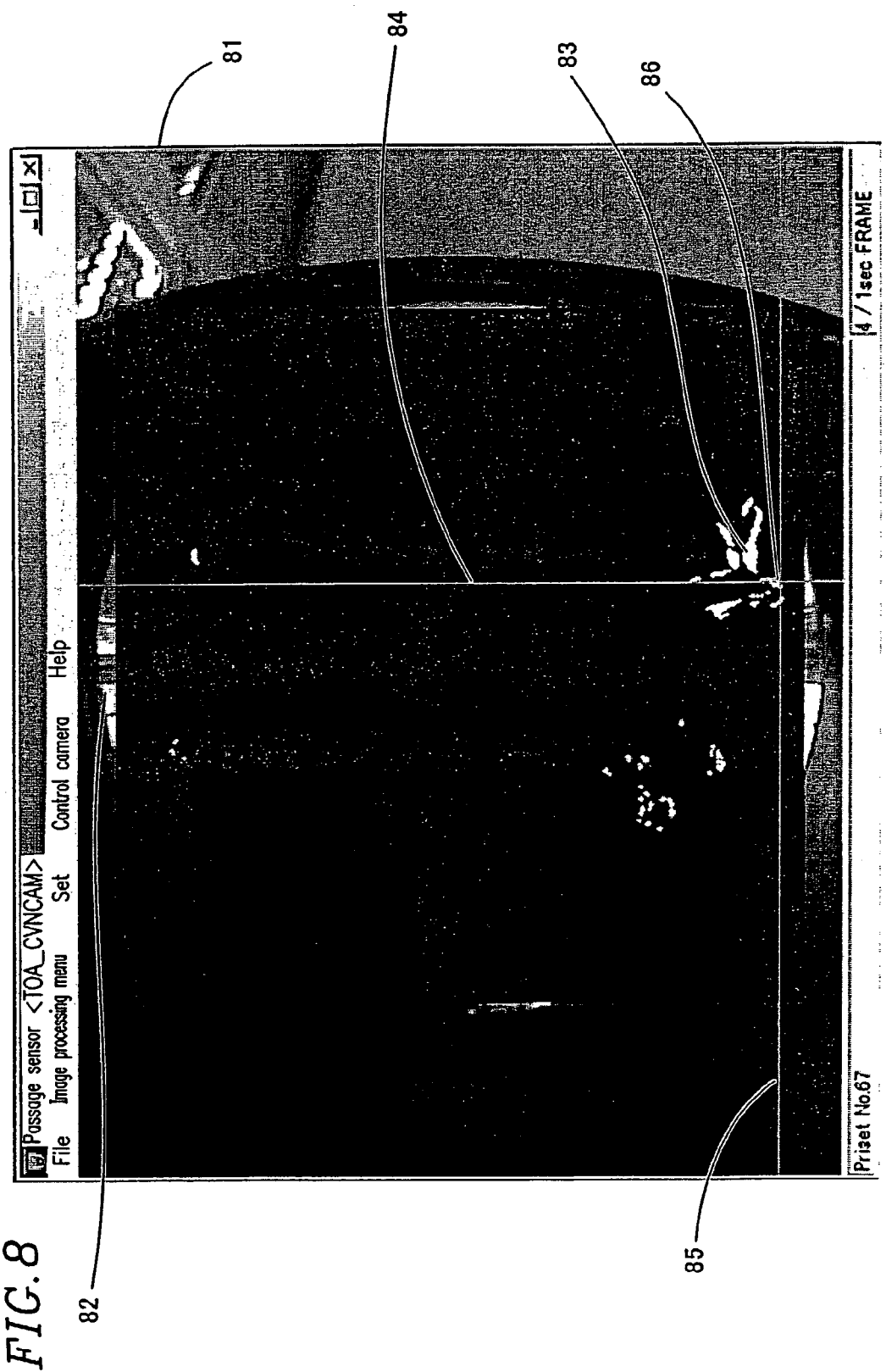
FIG. 8 shows Display Example (4) according to the example of the present invention, which is for detecting a moving body.

FIG. 8 shows Display Example (4) according to this example of the present invention. Display Example (4) is for detecting a moving body.

FIG. 8 shows a window 81 displayed on the display screen of the display section 3e. The window 81 shows a part of a omnidirectional image 82 which is mostly hidden, difference image data 83, a vertical cursor line 84, a horizontal cursor line 85, and an intersection 86 of the vertical and horizontal cursor lines 84 and 85. The difference image data 83 (white parts) is obtained by performing pattern matching of successive frames of the omnidirectional image 82 which has been stored in the image memory section 3d. The difference image data 83 represents a part in which the image has been changed due to, for example, a movement of a moving body. The vertical and horizontal cursor lines 84 and 85 track the difference data based on a certain criterion (for example, whether the area of the white parts is a prescribed level or higher), so that the intersection 86 represents the position of the moving body. By automatically specifying an area including the position represented by the intersection 86, the information on the image area including this position is converted into control information for zoom-photographing this image area by the zoom camera 1.

Figure 9:
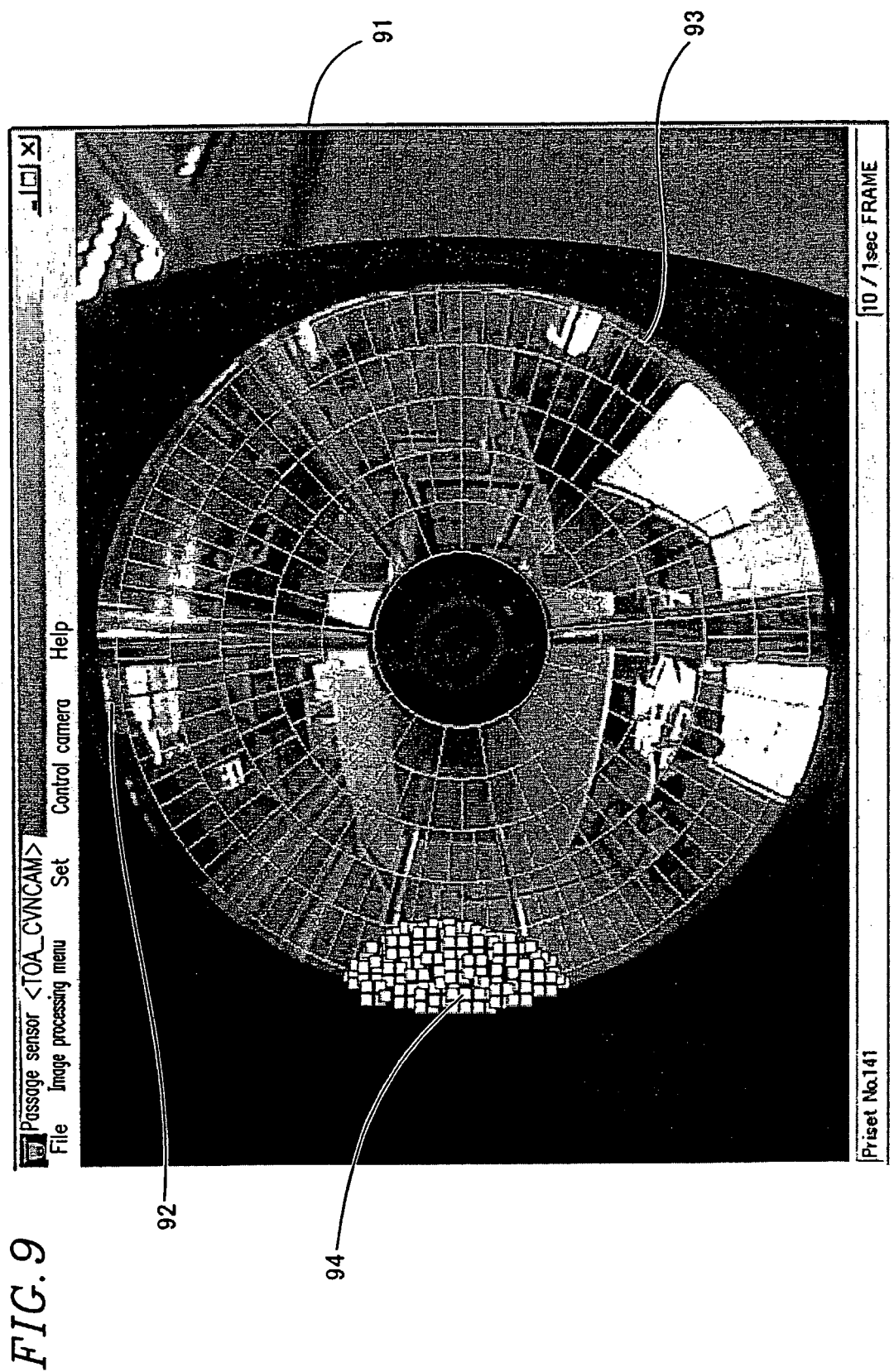
FIG. 9 shows Display Example (5) according to the example of the present invention, which is for setting an invalid area.

FIG. 9 shows Display Example (5) according to this example of the present invention. Display Example (5) is for setting an invalid area.

FIG. 9 shows a window 91 displayed on the display screen of the display section 3e. The window 91 shows a circular omnidirectional image 92, image frames 93 obtained as a result of dividing the omnidirectional image 92 equally by the dividing section 31a based on the numerical figures which was input in the window 63 (FIG. 6), and an image area 94 which has been preset as invalid by the invalid area setting section 36a. As described above, the invalid area setting section 36a presets, as invalid, an arbitrary image area in the omnidirectional image which is unstable due to the influence of environment. The image area 94 preset as invalid by the invalid area setting section 36a is not subjected to the specification by the specifying section 32a or the conversion by the converting section 34a.

FIG. 10 is a flowchart illustrating a basic operation procedure for the composite camera system 10 shown in FIG. 1.

As shown in FIG. 10, an omnidirectional image is photographed in step S1. More specifically, an omnidirectional image over a viewing angle of 360 degrees around the omnidirectional camera 2 is taken by the omnidirectional camera 2.

In step S2, the obtained omnidirectional image is displayed on the display screen of the display section 3e.

In step S3, it is determined whether or not control information for the omnidirectional image is to be set. When the control information is to be set (YES), the procedure goes to step S16. If the control information is not to be set (NO), the procedure goes to step S4.

In step S4, it is determined whether or not an image area in the omnidirectional image is to be zoom-photographed by automatic specification. When an image area in the omnidirectional image is to be zoom-photographed by automatic specification (YES), the procedure goes to step S5. When no image area in the omnidirectional image is to be zoom-photographed by automatic specification, (NO), the procedure goes to step S15.

In step S5, it is determined whether or not there is an image area which has been preset as invalid by the invalid area setting section 36a. If there is such an area (YES), the procedure goes to step S6. If there is no such area (NO), the procedure goes to step S7.

In step S6, the omnidirectional image excluding the image area preset as invalid is temporarily stored in the image memory section 3d frame by frame sequentially. Then, the procedure goes to step S8.

In step S7, since there is no image area preset as invalid, the entirety of the omnidirectional image is temporarily stored in the image memory section 3d frame by frame sequentially.

In step S8, it is determined whether or not there is difference image data in the omnidirectional image, using the moving body detecting section 35a. The difference image data is image data which has been positionally offset between two successive frames because of a movement of a moving body. If there is such data (YES), it is determined that a moving body has been detected, and the procedure goes to step S9. If there is no such data (NO), it is determined that no moving body has been detected, and the procedure returns to step S6. In step S6, pattern matching is performed for successive frames of the omnidirectional image which have been stored in the image memory section 3d, thereby creating a difference image. The difference image represents the positional offset of the image data caused by a movement of a moving body. Based on the difference image, it is determined whether or not there is a moving body.

In step S9, the specifying section 32a is used to cause the cursor to track the image data which is positionally offset by a prescribed level or greater, in order to indicate mainly in which image areas of the omnidirectional image that difference image data exists. Then, the area numbers of the image areas corresponding to the image data are sequentially specified.

In step S10, the converting section 34a is used to convert the information on the image area specified by the specifying section 32a (for example, the area number of the image area) into the preset control information.

In step S11, the communication section 3h is used to send the converted control information to the zoom camera control unit 4 via one of the communication lines 6.

In step S12, the zoom camera unit 4 controls the position and the magnification ratio of the zoom camera 1 based on the received control information via one of the communication lines 6.

In step S13, a target image area is zoom-photographed by the zoom camera 1.

In step S14, the zoom-photographed image is displayed on the display screen of the monitor 5. Thus, the procedure is completed.

In step S15, when the omnidirectional image was not zoom-photographed (NO in step S4), the specifying section 32a, which received an operation specification instruction through the mouse, is used to specify the area number of the image area to be zoom-photographed by the zoom camera 1. Then, the procedure jumps to step S10.

In step S16, when the control information is to be set (YES in step S3), the dividing section 31a is used to divide the omnidirectional image displayed on the display section 3e concentrically and radially. The area frame of each of the divided image area in the omnidirectional image is displayed, and the area number is added to each of the divided image areas.

In step S17, after step S16, the control information setting section 33a is used to preset the control information for controlling the position and the magnification ratio of the zoom camera 1 for each image area provided with the respective area number.

In step S18, after step S17, the preset control information is stored in the control information table 3f. Then, the procedure goes to step S4.

As described above, the composite camera system 10 according to this example of the present invention includes the following: the zoom camera 1 capable of being driven to pan, tilt and zoom; an omnidirectional camera 2 including an optical system 2a for projecting an optical image over a viewing angle of a maximum of 360 degrees, and an imaging section 2b for photographing the optical image as an omnidirectional image; a display section 3e for displaying the photographed omnidirectional image; a dividing section 31a for dividing the displayed omnidirectional image into a plurality of image areas; a specifying section 32a for automatically or manually specifying at least one image area from the plurality of image areas; a converting section 34a for converting the information on the image area specified by the specifying section 32a into control information for controlling the zoom camera 1 to be at a prescribed position and to have a prescribed magnification ratio for photographing the specified image area; and a zoom camera control section 4 for controlling the position and the magnification ratio of the zoom camera 1 for photographing the specified image area, based on the converted control information. Owing to such a structure, the composite camera system 10 can take an omnidirectional image including images of a plurality of important sites using the omnidirectional camera 2, and display the images of these important sites simultaneously as included in the omnidirectional image. The composite camera system 10 can also zoom-photograph a desired, specified image area in the omnidirectional image using the zoom camera 1.

In the above example, the remote controller 3 is connected to the omnidirectional camera 2 and the zoom camera 1 via the wireless or wired communication lines 6. Alternatively, the remote controller 3 and the zoom camera control unit 4 may be combined into one unit, or the remote controller 3 may be provided in the vicinity of the omnidirectional camera 2 and the zoom camera 1 as a controller.

In the above example, the composite camera system 10 includes one zoom camera 2. The present invention is not limited to such a structure. The control section 3a of the remote controller 3 may control the position and the magnification ratio of a plurality of zoom cameras via the zoom camera control unit 4. In this case, a plurality of display screens of the display section 3e may be provided in correspondence with the plurality of zoom cameras, or one display screen may display images corresponding to the plurality of zoom cameras sequentially.

In the above example, the position of the zoom camera is controlled by pan driving and tilt driving, and the magnification of the zoom camera is controlled by zoom driving. The pan driving, the tilt driving, and the zoom driving are merely examples for controlling the position and magnification ratio, and the present invention is not limited to this.

As described above, according to the present invention, positional control and magnification ratio control of the zoom camera are performed centered on a prescribed portion of omnidirectional image data, and the omnidirectional image and the zoom image are displayed. The omnidirectional camera is used to photograph a plurality of important locations simultaneously as included in the omnidirectional image, and the zoom camera is used to zoom-photograph a specified image area in the omnidirectional image. By specifying a prescribed image area in the omnidirectional image, the position of the zoom camera can be easily set.

The omnidirectional image over a viewing angle of a maximum of 360 degrees taken by the omnidirectional camera is divided into a plurality of image areas, and an image area of interest is automatically or manually specified among the plurality of image areas. Thus, the specified image area of interest is zoom-photographed by the zoom camera which can be driven to pan, tilt and zoom. Since a large-area monitoring area is photographed by one omnidirectional camera, it is not necessary to install a plurality of monitoring sensors, for example, a plurality of detecting sensors or input sensors for automatic specification of the target image area.

The plurality of image areas obtained by dividing the omnidirectional image act as a plurality of detection sensors or input sensors to calculate the control information for the image area automatically or manually specified. Based on the control information, the zoom camera is controlled to be at a prescribed position (to assume a prescribed photographing direction) and to have a prescribed magnification ratio.

The zoom camera can track a moving body included in the omnidirectional image taken by the omnidirectional camera, zoom-photograph the moving body, and display an enlarged image of the moving body on a display screen of the display section.

In the case where a circular omnidirectional image is divided into a plurality of image areas, and control information is set for controlling the zoom camera to be at a prescribed position and to have a prescribed magnification ratio for each of the plurality of image areas, the division can be performed effectively and the image areas can be displayed so as to be easily identifiable.

Control information for controlling the zoom camera to be at a prescribed position and to have a prescribed magnification ratio for each of the plurality of image areas provided with the respective area numbers can be preset, while viewing the omnidirectional image displayed on the display screen of the display section.

An image area, in the omnidirectional image, which is unstable due to environmental influence can be invalidated in advance. Therefore, a moving body or an abnormality can be accurately detected automatically from the omnidirectional image, so that the position and the magnification ratio of the zoom camera is accurately controlled for the detected moving body or the site of the abnormality.

A plurality of monitoring areas which are to be photographed in different photographing directions can be set for one omnidirectional camera. When a moving body is detected to have entered the monitoring area, alarm information including an alarm sound is output and also the zoom camera is zoomed to the moving body to display the image of the moving body on the display screen of the display section.

The omnidirectional camera and the zoom camera can be remote-controlled via a communication line. Therefore, at a site where a computer is installed, the above-described division of the omnidirectional image, preset of the control information for controlling the position and the magnification ratio of the zoom camera for a specified image area, and photographing and display of an area including the specified image area can be performed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A composite camera system, comprising:
    a control section for performing positional control and magnification ratio control of at least one zoom camera ratio for omnidirectional image data centered on a prescribed portion thereof, the omnidirectional image data being obtained by an omnidirectional camera capable of taking an omnidirectional image over a viewing angle of a maximum of 360 degrees; and
    a display section for displaying an omnidirectional image taken by the omnidirectional camera and a zoom image taken by the zoom camera,
    wherein, when the omnidirectional image is circular, the control section equally divides the omnidirectional image concentrically and radially into a plurality of concentrically and radially divided image areas based on input data representing the number of image areas and presets control information for controlling the zoom camera in each of the plurality of concentrically and radially divided image areas.

2. A composite camera system according to claim 1, wherein the positional control for controlling a photographic position is performed by pan driving and tilt driving, and the magnification ratio control is performed by zoom driving.

3. A composite camera system according to claim 1, wherein the prescribed portion of the omnidirectional image data is a divided image area which is set in a photographed image.

4. A composite camera system according to claim 1, wherein the control section includes:
    a dividing section for dividing the omnidirectional image displayed on a display screen of the display section into the plurality of image areas;
    a specifying section for automatically or manually specifying at least one image area from the plurality of image areas;
    a converting section for converting information on the at least one image area specified by the specifying section into control information for controlling the zoom camera to be at a prescribed position and to have a prescribed magnification ratio for photographing an image area specified by the specifying section; and
    a zoom camera control section for controlling the zoom camera to be at the prescribed position and to have the prescribed magnification ratio for photographing the image area specified by the specifying section, based on the control information converted by the converting section.

5. A composite camera system according to claim 1, wherein the omnidirectional camera includes an optical system for projecting the omnidirectional image using a mirror of a parabolic or hyperbolic convex body of revolution, or a fish-eye lens.

6. A composite camera system according to claim 4, further comprising:
a control information setting section for presetting the control information for controlling the zoom camera to be at the prescribed position and to have the prescribed magnification ratio for each of the plurality of image areas obtained by the dividing section; and
a control information table for storing the preset control information in correspondence with the position of each of the plurality of image areas,
wherein the converting section obtains the control information for the image area specified by the specifying section from the control information table and/or from calculation using a prescribed calculation procedure.

7. A composite camera system according to claim 4, further comprising:
an image memory section for temporarily storing the omnidirectional image taken by the omnidirectional camera frame by frame sequentially; and
a moving body detection section for detecting a movement of a moving body by performing pattern matching of successive frames of the omnidirectional image stored in the image memory section;
wherein the detected moving body is zoom-photographed by the zoom camera, and an enlarged image of the moving body is displayed on the display screen of the display section.

8. A composite camera system according to claim 4, wherein when the omnidirectional image is circular, the dividing section displays the plurality of concentrically and radially divided image areas of the omnidirectional image together with area frames defining the plurality of image areas.

9. A composite camera system according to claim 6, wherein the dividing section displays the plurality of image areas of the omnidirectional image together with area frames and area numbers defining the plurality of image areas, and the control information setting section presets the control information for controlling the zoom camera to be at the prescribed position and to have the prescribed magnification ratio for each of the plurality of image areas provided with the area numbers.

10. A composite camera system according to claim 4, further comprising an invalid area setting section for presetting, as invalid, an arbitrary area of the omnidirectional image which is unstable due to environmental influence,
wherein the invalid area setting section invalidates the specification of the image area by the specifying section.

11. A composite camera system according to claim 7, further comprising:
a monitoring area setting section for setting at least one monitoring area in the omnidirectional image; and
an alarm information output section for outputting alarm information when the moving body detecting section detects that the moving body has entered the monitoring area,
wherein the zoom camera zoom-photographs the moving body which has entered the monitoring area and displays the photographed image of the moving body on the display screen of the display section.

12. A composite camera system according to claim 1, further comprising a remote controller connected to the omnidirectional camera and the zoom camera via a wireless or wired communication line,
wherein an omnidirectional image taken by the omnidirectional camera and an image taken by the zoom camera are transferred to the remote controller via the communication line.

13. A composite camera system according to claim 12, wherein the remote controller includes at least the dividing section, the specifying section, and the converting section.

14. A composite camera image display control method, comprising the processing steps of:
performing positional control and magnification ratio control of at least one zoom camera for omnidirectional image data centered on a prescribed portion thereof, the omnidirectional image data being obtained by an omnidirectional camera capable of taking an omnidirectional image over a viewing angle of a maximum of 360 degrees; and
displaying an omnidirectional image taken by the omnidirectional camera and a zoom image taken by the zoom camera,
wherein, when the omnidirectional image is circular, the step of performing positional control and magnification ratio control includes equally dividing the omnidirectional image concentrically and radially into a plurality of concentrically and radially divided image areas based on input data representing the number of image areas and presetting control information for controlling the zoom camera in each of the plurality of concentrically and radially divided image areas.

15. A zoom camera control method for performing positional control and magnification ratio control of at least one zoom camera for omnidirectional image data centered on a prescribed portion thereof, the omnidirectional image data being obtained by an omnidirectional camera capable of taking an omnidirectional image over a viewing angle of a maximum of 360 degrees, the method comprising the steps of:
displaying an omnidirectional image taken by the omnidirectional camera;
equally dividing the omnidirectional image displayed on a display screen of the display section concentrically and radially into a plurality of concentrically and radially divided image areas based on input data representing the number of image areas;
automatically or manually specifying at least one image area from the plurality of image areas;
converting information on the at least one image area specified by the specifying section into control information for controlling the zoom camera to be at a prescribed position and to have a prescribed magnification ratio for photographing the image area specified by the specifying section; and
controlling the zoom camera to be at the prescribed position and to have the prescribed magnification ratio for photographing the concentrically and radially divided image area specified by the specifying section, based on the control information converted by the converting section.

16. A control program for causing a computer to execute the steps of:
displaying an omnidirectional image taken by the omnidirectional camera;

equally dividing the omnidirectional image displayed on a display screen of the display section concentrically and radially into a plurality of concentrically and radially divided image areas;

automatically or manually specifying at least one image area from the plurality of image areas;

converting information on the at least one image area specified by the specifying section into control information for controlling the zoom camera to be at a prescribed position and to have a prescribed magnification ratio for photographing the image area specified by the specifying section; and controlling the zoom camera to be at the prescribed position and to have the prescribed magnification ratio for photographing the concentrically and radially divided image area specified by the specifying section, based on the control information converted by the converting section.

17. A computer readable recording medium having a control program according to claim 16 stored therein.

18. A control program for causing a computer to execute the processing steps of a composite camera image display control method according to claim 14.

19. A computer readable recording medium having a control program according to claim 18 stored therein.

* * * * *